United States Patent [19]

Martin

[11] Patent Number: 4,836,030

[45] Date of Patent: Jun. 6, 1989

[54] METHOD OF TESTING COMPOSITE MATERIALS FOR STRUCTURAL DAMAGE

[75] Inventor: David A. Martin, St. Petersburg, Fla.

[73] Assignee: Lockheed Corporation, Calabasas, Calif.

[21] Appl. No.: 735,619

[22] Filed: May 20, 1985

[51] Int. Cl.$^4$ ................................................ G01L 1/24
[52] U.S. Cl. ..................................................... 73/800
[58] Field of Search ................................. 73/800, 802

[56] References Cited

U.S. PATENT DOCUMENTS 3,910,105 10/1975 Hoffstedt ............................. 73/800

OTHER PUBLICATIONS

Claus et al., "Nondestructive Evaluation of Composites . . . ", Proc. IEEE, 3/31-4/3/85, [abstract only].
Wade et al., "Interferometric Techniques . . . ", Conf. Paper, 1983, [abstract only].
Crane et al., "Fiber Optics for a Damage Assessment . . . ", Conf. Paper, 1983, [abstract only].

Primary Examiner—Thomas H. Tarcza
Assistant Examiner—Ian J. Lobo
Attorney, Agent, or Firm—Ronald E. Smith; Louis L. Dachs

[57] ABSTRACT

A method of testing composite materials for structural damage. A plurality of optical fibers are embedded in the composite material in predetermined patterns and light is introduced into one end of each fiber. A computer-connected optical receiver disposed in light-collecting relation to the opposite end of each fiber senses the presence or absence of light emerging therefrom. Detection by the computer that light has passed through any given fiber indicates that the composite is free of damage in the area along the extent of that fiber. If light is not detected emerging from any given fiber, this indicates that damage has occurred in that part of the composite structure within which that particular fiber is embedded.

9 Claims, 2 Drawing Sheets

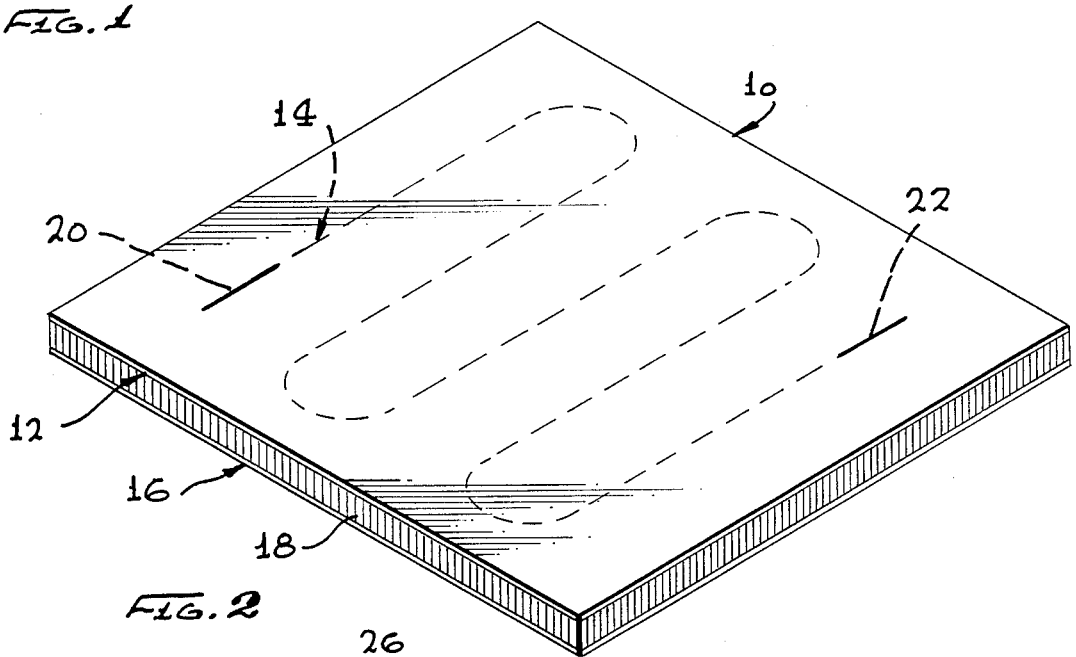
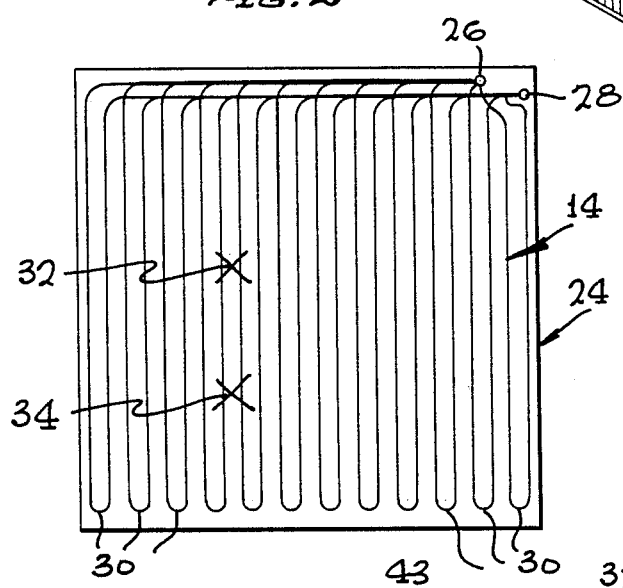
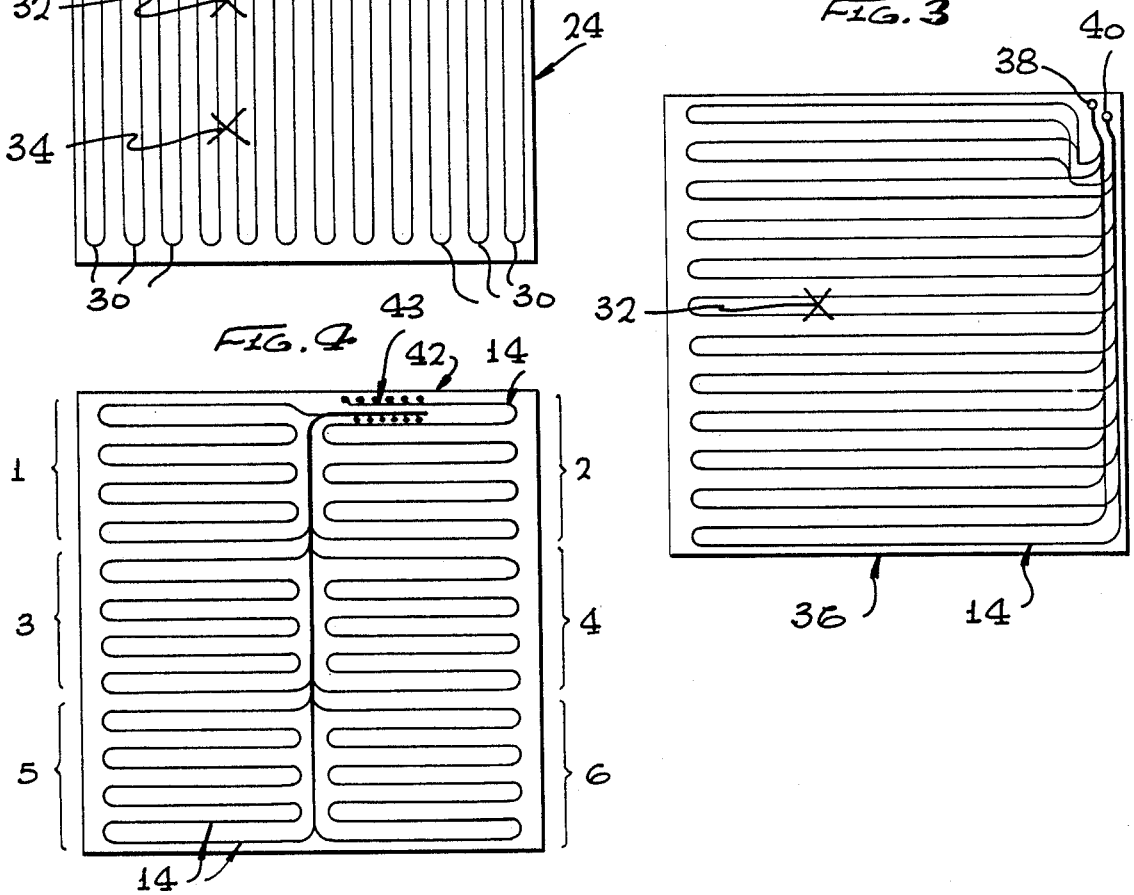

METHOD OF TESTING COMPOSITE MATERIALS FOR STRUCTURAL DAMAGE

BACKGROUND OF THE INVENTION

1. Field of the Invention

This invention relates to a method, and means to perform the method, of testing materials formed of composite construction for structural damage and making instantaneous assessments of the extent of damage. More specifically, the invention relates to the use of optical fibers in a composite damage detection method.

2. Description of the Prior Art

Many types of composite materials may be formed in solid laminate or in various laminated core constructions.

Solid laminated composites are formed by a plurality of alternating cloth layers, or plys, which typically are impregnated with a pre-mixed resin system, there being many different types of cloth and many different types of resin used in many different combinations and employing many different procedures for ply build-up. Sections of components or complete components may include light in weight resin reinforced paper honeycomb cores, metal honeycomb cores, or various plastic foam cores.

All types of composite materials are strong but light in weight. Their strength compares favorably with aluminum, titanium alloys and other metals commonly used in fixed and rotary wing aircraft, and in space craft. Due to their high strength for weight ratio, they have become the material of choice in many airborne applications.

Accordingly, aircraft and space craft parts are now being manufactured in composite form. Many flights of airborne vehicles of composite construction have been flown, and a serious problem has become apparent. The problem is so serious that the composite industry has invested and is continuing to invest substantial amounts of money in an effort to overcome it, but the solutions found heretofore have been mere refinements of previous technology.

The problem that has been encountered relates to testing the composite materials for safety purposes. Namely, the known methods of testing composite materials for structural defects or other forms of damage are inadequate. The result has been loss of life and loss of highly sophisticated equipment.

For example, it has been publically reported that the tail section of a U.S. Air Force F-14 aircraft separated from the fuselage of the aircraft in flight, which structural failure resulted in the death of the crew members and in loss of the aircraft. The aircraft had been subjected to the known safety inspections, to no avail.

The F-14 disaster, unfortunately, is merely one of a series of disasters that have befallen aircraft having composite components.

The difficulty in safety checking a composite part arises because of the properties of the materials of which component parts are made. Being non-metallic, the customary techniques of examination are of no effect. More specifically, the parts cannot be effectively examined with X-rays and cannot be visually inspected with any degree of reliability. Composite components can be rendered structurally unsound by either formed-in improperly bonded defects, or by subsequent damage to a properly formed component. Since composite components are often highly stressed structural elements, the application of normal stress to a component with undetected formed-in defects or undetected subsequent damage can result in catastrophic failure of the component.

Due to the non-monolithic nature of composite construction, all but the most obvious of defects or damage are difficult to non-destructively detect, especially when the unsound area is deep inside the structure or in a particularly inaccessable location.

Presently, the same means and equipment are used to detect both defects and damage. All present means and methods are different forms of an acoustic process, i.e., inexact portable ultrasonic, C-scan (which is much more accurate), or McDonnell Douglas' new water jet ultrasonic inspection. All these methods are useful for detection of formed-in defects where equipment, technicians, set-up time, and component access is readily available.

However, all current test methods are inadequate in many ways for detection of subsequent damage to composite components when there is a critical need for accurate, immediate field information as to the serviceability of often inaccessible composite components.

Acoustical techniques are the industry standard and have met with some degree of success, but such techniques have serious limitations. Perhaps the greatest limitation is the need for complex, costly and immobile equipment to conduct the tests. Acoustical tests must be performed in an acoustics laboratory under carefully controlled conditions, and can not be performed in the field, without dismantling and removal of the component, with any acceptable degree of reliability at any location not suitably equipped. Moreover, due to the size and weight of the acoustical testing equipment, as well as the nature of the test process itself, such equipment cannot be carried by aircraft or spacecraft, even if the test process could be conducted in-flight, with the result that developing composite problems cannot be monitored by the crews of the vehicles.

Go or no-go decisions must often be made quickly in the field wherever composite aircraft are in use. The no go decision becomes virtually mandatory in most situations where the extent of damage to the aircraft is unknown, due to the very high degree of risk involved. Where unknown damage has occured and the aircraft is put in service, disasterous and expensive results can and have occured.

The art of composite material safety testing is so poorly developed that it is hampering governmental and private development of composite airborne vehicles and is endangering the lives of crews of composite-reliant aircraft.

There is a clear need for a testing method, and means for performing the method, that tests composite materials with a high degree of reliability and in remote locations with minimal amounts of equipment and unskilled personnel, but the state of the art contains no suggestions on how to fulfill this important need.

Another art, unrelated to the art of composite materials, is the art of fiber optics. Perhaps the greatest use of optical fibers is in the information transmission industry, where optical fibers are being used more and more in lieu of wires. Also, researchers having an interest in the computer industry are currently investigating the feasibility of the use of optical fibers in computers, in lieu of the electronics parts now used, in order to increase computing speed. Optical fibers are used in other applications as well, but it is believed that the disparate arts of composite materials and optical fibers were segregated prior to the filing of this disclosure.

SUMMARY OF THE INVENTION

The longstanding need for a reliable method of field testing composite structures, whether of the solid laminate or cored type, is now fulfilled by a method that teaches a new use for optical fibers.

A plurality of optical fibers are embedded in the composite structure at the time the structure is manufactured.

For each different composite component, it is decided in advance what specific information is desired from the system, and then a particular optical fiber array is designed to render the desired information. By including "sensor plys" which include optical fibers provided at specific intervals during ply build-up, and in specific patterns at each interval, discrete information can be obtained through the thickness of the laminate. In some cases, the information desired will allow all or several of the optical fibers to be contained in one sensor ply. In other cases, some of the fibers would be contained in sensor plys near the surface of the laminate and other fibers would be contained in sensor plys disposed deep within the laminate. Still other cases would require special delamination detection sensor plys to be located in internal joints within the laminate or immediately adjacent internal fittings, where detection of delamination is critical. The form of the individual component and the exact information desired will dictate the pattern and location of each individual optical fiber.

In all cases, whether there is one optical fiber or several in each sensor ply, or whether there is one over all pattern for one or more fibers, or if there are several patterns, where one overlies another, the method of sensor ply fabrication and the method of including the sensor plys in the part fabrication will be the same, to wit:

Fabrication in production, for purposes of repeatability, is performed by robot. Sensor plys are constructed on film adhesive (a thin layer of resin on a paper carrier sheet) having the same resin system as the component which will eventually contain the sensor ply. The robot arm has a specially designed optical fiber dispenser. The dispenser includes a small heating element which slightly pre-heats the resin in the path of a roller which feeds and impresses a continuous fiber into the softened resin as the robot arm traces a specified pattern. The dispenser begins and cuts the fiber at each termination location. The robot also cuts the over all film adhesive shape as specified, and places identification labels and registration tags thereon. Registration tags are needed later in the construction process to properly orient and align the sensor ply as it is placed into the lay-up during component fabrication. The completed sensor ply may be packaged, stored according to the limitations of the resin system of the film adhesive, and shipped to any location for inclusion in a component lay-up. The sensor ply is, basically, a standard detail part during the lay-up of the component. In some cases the connectors may be installed on the optical fibers before packaging the detail part for storage. In other cases it may be necessary for the connectors to be installed after the lay-up, as a secondary operation. In either case, robot tagging of both ends of each fiber at the termination locations is necessary to correctly identify each fiber during connector installation. Where the desired information is qualitative in nature, each fiber is individually monitored. Where the desired information is quantitative in nature, several fibers are bundled at the signal input end, individual fibers are arrayed in parallelism over a surface, and each individual fiber represents a percentage of that total surface. The fibers are again bundled at the signal output. Where damage has occured, the dimensions of the damaged area (as defined by the number of fibers not transmitting light) directly relates to the percentage reduction of light intensity transmitted by the bundle. When two such quantitative bundles are placed together in overlying relation, and with the lower or underlying layer having its fibers disposed perpendicular to the fibers of the overlying layer, an accurate assessment of the size of the damage-affected area can be calculated in both "X" and "Y" dimensions when using Cartesian coordinates. The location is provided by additional qualitative optical fiber layers.

In all embodiments, light is introduced into a first end of the fibers. In embodiments rendering quantitative information, a fiber bundle is employed. A light sensing means or optical receiver is disposed at the opposite end of the bundle, and senses the intensity of the light that successfully travels the length of the respective fibers in the total fiber bundle.

The sensing means transmits data to a portable microcomputer that has stored in its memory the values of light intensity that should be received by the sensing means in the absence of structural defects or damage. The actual intensity sensed is then compared with the reference intensity; and if there is a difference in intensities, the percentage of that difference represents the percentage of fibers in the total bundle which are damaged and which are no longer transmitting light. That number of fibers, multiplied by the spacing between the arrangement of fibers, provides an accurate one dimensional measurement of the damaged zone. Moreover, a second similar quantitative layer, perpendicualr to the first layer, provides a two dimensional measurement of damage. Both of these layers may be laid within the same film adhesive ply and put into the lay-up as a single layer. Where this layer is near the surface of a component, and a similar two dimensional ply is disposed deep within the structure, analysis of both plys indicates if damage has gone all the way through at the same dimensions, been reduced in size as it penetrated the structure, or is limited just to the surface. Each of these plys, which contain two distinct quantitative sensing systems, may also contain several qualitative fibers as well which can collectively identify the location of the damaged area.

In embodiments rendering qualitative information, single fibers are evaluated individually, rather than as a percentage of a bundle. A light sensing means in the form of an optical receiver is disposed at the output end of each fiber, there being one receiver for each fiber, and senses the presence or absence of light. The sensing means transmits the information to the microprocessor which has stored in its memory the exact location of that particular fiber. The absence of light transmission indicates damage somewhere in the zone within which that particular fiber is embedded. Information from the other fibers indicates the presence or absence of damage in all other zones as well. Collective information from all fibers allows the microprocessor to ascertain the extent of damage. Information contained in the microprocessor allows it to evaluate the implications of the damage (some zones could sustain more damage than other zones and the component could still be operational, while certin other zones may not be capable of sustaining any damage whatsoever), and then summarize and report the results, along with recommendations in the form of predetermined decisions based upon anticipated combinations of conditions.

In view of the low cost of microcomputers and of optical fibers, and in view of the low cost of software development, the subject method of detecting damage in composite structures may be performed economically. More importantly, the method can be employed in the field by unskilled personnel, and may even be performed continuously by computers while an aircraft is in flight. When employed in flight, computers advise the flight crew when composite materials are beginning to fail so that appropriate action can be taken. In the case of ballistic damage, computers inform the crew as to how critical the damage is, and whether the craft is still mission worthy.

It is the primary object of this invention to provide a method for testing composite materials for damage, with much greater speed and with a higher degree of reliability than that which is currently available.

Another object of this invention is to disclose, in the interest of clarity, one example of specific hardware that could be employed with little or no modification to perform the steps of the method.

A related object is to provide a method of composite testing that can be performed in the field, and which is not restricted to laboratory conditions as are the methods known heretofore, and which can be employed by unskilled personnel without decreasing the reliability of the results.

Still another related object is to provide a method of composite testing that can be performed with inexpensive, commercially available parts.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of a piece of composite material having an optical fiber embedded near its surface in serpentine configuration;

FIG. 2 is a plan view of a ply of resin having a second configuration of optical fibers embedded therein;

FIG. 3 is a plan view of a ply of resin having a third configuration of optical fibers embedded therein;

FIG. 4 is a plan view of a ply of resin having a fourth configuration of optical fibers embedded therein;

Similar reference numerals refer to similar parts throughout the several views of the drawings.

DETAILED DESCRIPTION OF THE PREFERRED EMBODIMENT

Figure 5:
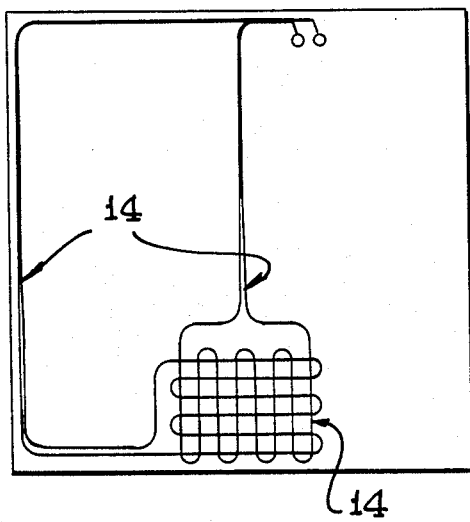
FIG. 5 is a plan view of a ply of resin having a fifth configuration of optical fibers embedded therein.

Referring now to FIG. 1, it will there be seen that a planar in configuration item formed of a composite material is indicated by the reference numeral 10 as a whole. The item 10 includes a top multi-ply thin facing 12 having an optical fiber 14 embedded in a film adhesive layer and contained among the plys therein, a bottom thin facing 16 having no optical fibers embedded therein, and a honeycomb or solid laminate core 18.

It should be understood from the outset that the item 10 could be an airplane wing, helicopter rotor blade, or other structural component of airplanes, helicopters, space craft and the like. Moreover, composites are employed in land vehicles and installations as well. The item 10, accordingly, is merely shown for convenience of illustration and the scope of the subject invention encompasses any and all items having a composite construction.

In the embodiment of FIG. 1, a single elongate optical fiber 14 is shown embedded slightly below the upper surface of item 10, within top facing 12. The medial portion of the fiber is shown in phantom lines for reasons that will become apparent as this description proceeds.

The FIG. 1 embodiment, a prototype, was constructed as follows: a two hundred (200) micron (diameter of core) epoxy buffered optical fiber was positioned in a serpentine configuration on an uncured epoxy film adhesive. The fiber was captured between two (2) layers of 0.01" thick film adhesive through the use of a hot air gun and a roller. (The hot air slightly melts the uncured epoxy, and the roller applies slight pressure to the fiber to embed it within the softened epoxy, which epoxy again solidifies uncured when the heat source is removed). Thus, the outer surfaces of the film adhesive contained within facing 12 were made flat by the roller, although it should be understood that fibers can be embedded in curved surfaces as well. However, it is believed to be more practical, for curved laminations, to embed the optical fibers in the same manner but to design the fiber patterns so that the film adhesive ply containing them may be notched, cut, etc., while it is flat (and without causing damage to the fibers contained therein) and then laid into the single or double curved surface as with any flat fabric. It should also be noted that several different fibers in several different patterns may be contained in one film adheesive ply, and that the novel process is not restricted to one fiber pattern per ply such as is illustrated in the example of FIGS. 1–7. It could be desireable, for example, to contain the fibers of FIGS. 2 and 3 within the same film adhesive ply, or to put all the fibers of FIGS. 2–5 within the same film adhesive ply.

The opposite ends 20 and 22 of fiber 14 were not embedded, but were enclosed in a plastic sleeve formed from high temperature tape. These fiber ends with sleeves were brought through slits in the film adhesive and left loose on the outside surface of the film adhesive. During the lay-up of facing 12, the ends 20 and 22 were also brought through slits in the top laminate layers, and left loose on the outside surface of facing 12. The purpose of the plastic sleeve is to prevent the fiber ends from being permanently embedded in facing 12 during the cure cycle, and to permit easy retrieval of these fiber ends. Facing 12 was laid up onto honeycomb core 18 with ends 20 and 22 exposed on the outer surface. The entire lay-up of item 10 was vacuum bagged between rigid aluminum plates and oven cured. After curing and trimming of item 10, small incisions were made in the plastic sleeves enclosing ends 20 and 22. The fiber ends were easily retrieved from the embedded sleeve, so that exposed ends 20, 22 of the fiber 14 were on the surface of item 10 as illustrated.

Facing 12 consisted of a few plys of a woven glass fabric known as E-Glas, which had been pre-impregnated with a premixed, uncured epoxy resin system, on both sides of the film adhesive layer within which the optical fiber was embedded. The complete lay-up was vacuum bagged to approximately 26″ Hg and held under such pressure for 1 hour and 15 minutes, at 260 degrees Fahrenheit to cure the resin. The fiber withstood the curing process and subsequent cooling to ambient temperatures and remained intact and embedded, and transmitted light from end 20 to end 22 without apparent attenuation. The heat and pressure employed caused hydraulic movement of some of the film adhesive resin through the inner plys of facing 12, causing noticeable enlargement of core fillets. This may have caused resultant pressure on fiber 14 which may have occasioned some bending of the fiber inward toward the core as it spanned between cell walls of the core. If this bending actually occured, it did not cause fiber 14 to fail to transmit the light beam, not was it perceived to decrease the intensity of the transmitted light beam. Other possible problems of the process were also demonstrated to have no detrimental effect, such as shear forces where the fiber passed through slits in the fiberglass plys, tensile and compressive forces due to temperature expansion and contraction, and heat deformation of the fiber itself. It is believed that the embedding and curing processees are forgiving enough that they do not apply shearing or other destructive forces to the fiber, apparently because the fiber is constrained in a more or less solid resin matrix, and the pressures on the fibers are therefor hydraulic in nature and thus uniform. Further, hydraulic flow of the resin through the multi-ply lay-up would occur only as the resin reached higher temperatures. In this condition the resin is at its lowest viscosity and is relatively thin, and each fiber in a lay-up nests and accommodates itself to its neighboring fibers. The relatively large size of the optic fiber compared to any neighboring fibers is believed to cause the other fibers to accommodate and adjust to the optic fiber, rather than the reverse. At any rate, in actual practice it was obseerved that there were no damaging forces applied to the optic fiber, as demonstrated by its successful and high quality transmission of the light beam.

It should be understood that due to the simplicity of the system (which system relies only upon the gross presence or complete absence of a signal, rather than upon nuances of difference in a high quality signal), a high degree of signal degradation could be tolerated and the system still would perform with 100% success. The high degree of signal transmissiveness in this representative prototype example simply means that if there are fabrication requirements for certain applications which are later discovered to degrade signal quality, there is a very high liklihood that the system can be successfully employed even under those conditions.

A similar experiment was then performed with a fiber having a fifty (50) micron core and no epoxy buffer. Instead of a honeycomb core, the core employed was of the solid laminate type. The same curing process was performed, with the same results.

One additional capability was demonstrated with this second experiment, that of flexibility. This second experiment produced a solid laminate which was thin enough to permit manual non-destructive flexing of the sample. Repeated flexing of the sample did not diminish the embedded fiber's ability to transmit a high quality signal. It can be added that the success of this experiment demonstrated that performance is not reliant upon the presence of the epoxy buffer, as was present in the first experiment.

Reference should now be made to FIGS. 2-5, wherein a multi-ply embodiment of the subject invention is shown.

FIG. 2 shows a plurality of elongate fibers, collectively designated 14, embedded within a ply 24. Each fiber 14 has a first end attached to terminal 26 and a second end attached to terminal 28. As depicted in FIG. 2, each fiber 14 first extends from terminal 26 in a left to right direction relative to the page, then in a top to bottom direction until it reaches the bottom of ply 24. Each fiber then makes a return bend as at 30 and extends from the bottom to the top of the ply and finally from right to left until it terminates at terminal 28.

If each fiber at terminals 26 and 28 is separately monitored, and if damage were to be inflicted to ply 24, as by a bullet or other projectile, for example, at the area thereof indicated by an "X" 32, then in such event the fiber 14 passing through that particular point would not transmit light. In this particular example, point "X" cuts two (2) adjacent loops of fiber 14. In cartesian coordinates, the location of the damage would be identified by its X-axis (abscissa) coordinate only, because the bullet hole 32 could also be at the "X" indicated by the reference numeral 34 and the same two (2) fibers 14 would not transmit light.

Therefor, a separate plurality of fibers 14 are embedded within a second ply 36, as shown in FIG. 3. As in the ply of FIG. 2, each fiber extends from a first terminal 38 to a second terminal 40 in the manner illustrated. The Y-axis (ordinate) location of bullet hole 32 can now be pinpointed from data supplied by the X-axis terminals 26, 28 (FIG. 2) and the Y-axis terminals 38, 40 (FIG. 3).

It should also be understood that, in addition to providing a cartesian coordinate location function, the damaged fibers will also provide a quantitative report of the amount of damage done to a composite structure.

For example, since the exact spacing between fibers is known, the detected number of adjacent damaged fibers, when multiplied by the known fiber spacing, equals the diameter of the damaged area for that axis and location. Another approach using the exact fiber placement of FIGS. 2 and 3, but taking a completely quantitative rather than a qualitative approach, would reduce the number of connectors, and would reveal the X-axis and Y-axis dimensions of the damaged area, but would not reveal its exact location. If this level of information was acceptable, signal transmission in FIG. 2 would be as follows: the optical emitter would send a signal through a non-indexed multi-fiber bundle 26. The signal would pass through all fibers in FIG. 2, and return to the non-indexed fiber connector 28. In this case only the collective intensity of the signal is measured, and compared to a known 100% intensity. A reduction of this intensity of the signal indicates complete loss of signal by a certain number of fibers. Since the number of fibers is known, the percentage reduction of the signal intensity will indicate the exact number of fibers damaged, and this provides the collective X-axis dimension of damaged area.

FIG. 4 shows an arrangement of six (6) optical fibers 14 that divides a ply 42 into six (6) regions or zones. Thus, a total of twelve (12) terminals, collectively designated 43, is employed as shown. If the zones were numbered from left to right and top to bottom, damage indicated by the "X" in FIG. 4 would be reported as damage in zone four (4) of the item.

FIG. 5 shows ply 44 having two (2) fibers connected as shown for redundant monitoring of an area of particular interest, such as the location of an attachment fitting.

Figure 6:
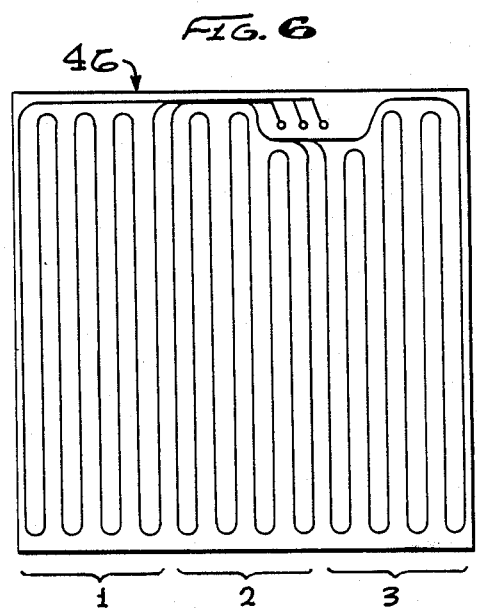
FIG. 6 is a plan view of a ply of resin having a sixth configuration of optical fibers embedded therein.
Figure 7:
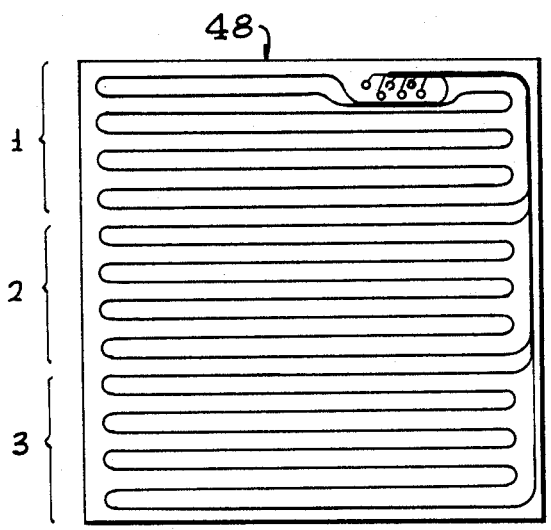
FIG. 7 is a plan view of a ply of resin having a seventh configuration of fibers embedded therein.

FIGS. 6 and 7, when overlaid in the same component, show configurations of six (6) fibers that divide plies 46 and 48 into nine (9) overlap zones as depicted.

Figure 8:
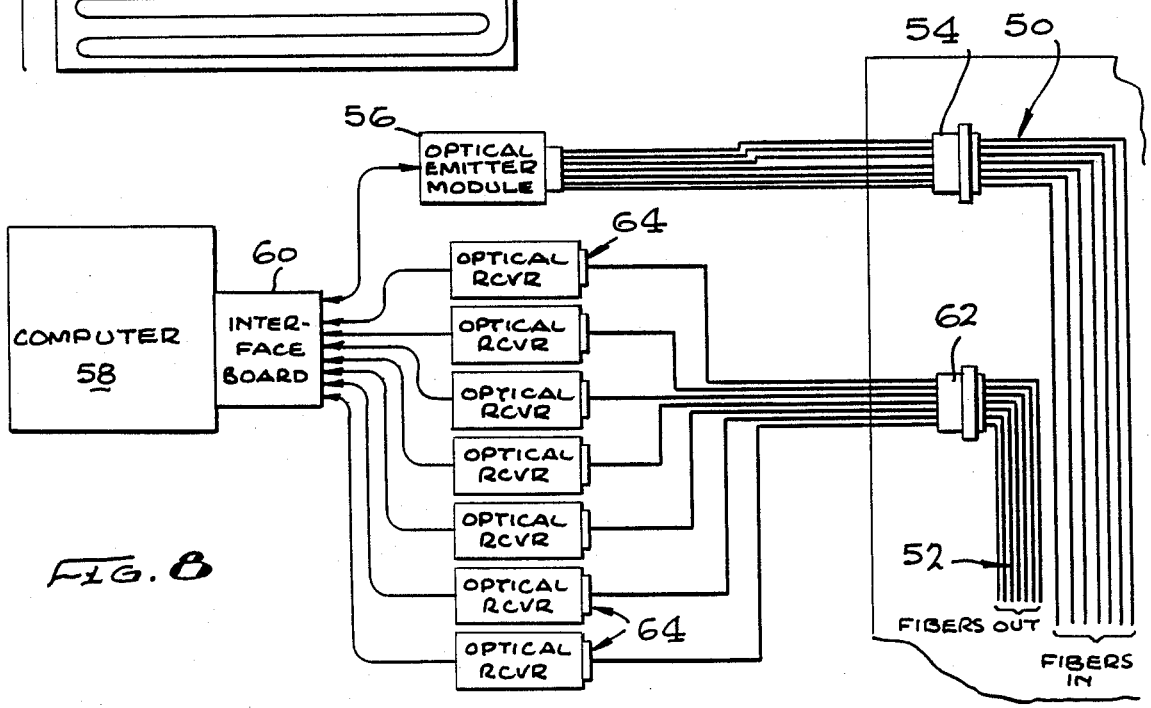
FIG. 8 is a diagrammatic representation of the parts employed in performing the inventive method.

The final Figure, FIG. 8, discloses one combination of standard parts required to perform the steps of this invention. The first end of a plurality of fibers is indicated as 50, and the opposite ends thereof are denoted 52. Ends 50 represent the light-receiving ends of the fibers, i.e., light is introduced into the fibers at ends 50.

The ends 50 are connected to a multi-fiber connector means 54 which in turn is connected to an optical emitter module 56. The module 56 is electrically connected to a microcomputer 58 through interface means 60.

Fiber ends 52 are similarly connected to a multi-fiber indexed connector means 62, which is in electrical communication with as many optical receivers 64 as there are fibers or fiber bundles being monitored. The optical receivers are in turn connected to the interface means 60 as shown.

For quantitative embodiments, the computer has stored within its memory a set of numerical values representing the intensity of light that would be received by each optical receiver 64 if its associated fiber bundles were undamaged. This value is compared to the value assigned to the intensity of the light actually received, and if the difference in the expected value and the actual value exceeds a predetermined threshhold, the computer generates a no-go decision. For qualitative embodiments, in which each single fiber is individually monitored, the computer can regularly and repeatedly generate a signal at emitter 56, and detect the presence or absence of a signal received at each receiver 64. The absence of a signal at any receiver 64 reveals that damage has occured somewhwere in the path of the particular fiber. For all embodiments, the computer must have in its memory, or access, the particular pattern taken by each fiber, the implications and conclusions for all possible combinations of fiber failure for the particular part being monitored, and the software program for reporting the damage detected, conclusions and recommendations. Where the fibers are being monitored on a continuous basis, as in an aircraft in flight, the computer drives a continuous display of the conditions of all monitored fibers.

Computer 58 is provided with an automatic gain software program. Suitable computers would be the Apple 2e with 8 bit capability, or the I.B.M. P.C. 2 with 16 bit capability, for example.

Interface board 60 should be of the digital type for some applications, but where some quantitative fiber bundles are used, such applications would require interface boards with both analog and digital capabilities.

A broadband-type optical emitter module 56 is acceptable for use in the inventive system, because the wavelength of the light used is not critical. The light source could be low cost quartz or halogen. A module successfully used in a prototype of the subject invention was an Oriel Model 77500. The optical transmitter employed was an Augat optical transmitter model number 698-M25-T1 having a digital data link with an analog capability. Another suitable transmitter is the Duplex Optical Modem model number PO-232 manufactured by Lightwave Communications, Ridgefield, Conn. These optical transmiters can be combined with any strobe light means.

The multi-fiber connectors, identified by reference numerals 54 and 62 in FIG. 8, may be of the 8 channel Amphenol 801 series, or ITT 8 channel connectors. The connector chosen should be able to join a 1TO7splitter (100 micron core fiber) to non-indexed fibers into the material (50 micron core fiber) as shown in FIG. 8. For many applications, it will be an advantage to utilize multi-fiber connectors which join a larger number of fibers per connector such as the Multimate "W" series 26 fiber connector, or any number of fibers utilizing the face plate method of the type manufactured by Collimated Holes, Inc., Campbell, Calif.

Optical fibers 50, 52 must be capable of withstanding the 250 degree Fahrenheit and 350 degree Fahrenheit resin cure temperatures common to composite structures. Plastic fibers are not believed to be appropriate, but low cost glass fibers have been found to be ideal. The smallest diameter fibers currently available (50 micron core) allow the greatest application capability since they have the smallest minimum radius when bent. Use of 0.55 N.A. glass provides easier coupling as it has a smaller cone angle. Stepped index fibers are more appropriate than graded index fibers. Silica fibers are also acceptable. A 50 micron core fiber is available from Fort Fiber Optics, and a 55 micron core in either glass or silica is available from ITT (T101, T102, T103, or T201, T202, T203).

Fibers between the connector and emitter, or between the connector and receiver are not bonded into the material and therefore are not exposed to the high resin curing temperatures. These fibers may be plastic, glass, or silica. To facilitate connections, these fibers should have a large core diameter such as the 200 micron core diameter fibers manufactured by Thomas & Betts (Fort Fiber Optics), Valtec (Model number PC08), ITT (T321, T322, T323), and Fibropsil QSF-AS.

A good optical receiver is the Augat Optical Receiver 698-M25-R1 or 698-M25-R2.

Although FIGS. 2–5 were discussed by making reference to damage of the type caused by a bullet, it should be understood that the subject invention has utility as well in the field of detecting structural defects in composite materials. For example, where laminated composites are used, delamination is a common problem. It has been determined that the subject method pinpoints the locations of delaminations as well as it identifies the location of other types of damage.

Those skilled in the art of composites, and specifically in the art of composite damage-detection, and those skilled in the art of fiber optics will recognize that the present invention marries two (2) disparate technologies and provides a simple yet powerful solution to a major problem in the composite industry. The damage-detection methods taught herein have far-reaching implications in both civil and military applications.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, that which is claimed is:

1. A method of detecting non-molded defects or damage in structural components of composite construction, comprising the steps of
    embedding a predetermined length of at least one optical fiber within a composite component, comprising the steps of:
        forming at least one layer of film adhesive having at least one optical fiber of a predetermined length embedded therein;
        thereafter forming said composite component having said at least one layer of film adhesive incorporated therein;
    introducing electromagnetic radiation of a known intensity into a first end of said at least one optical fiber,
    detecting and measuring the intensity of the radiation emitted from said at least one optical fiber at a second end thereof,
    and comparing the intensity of the detected radiation with the intensity of a reference or detecting the presence or absence of radiation emitted from said at least one optical fiber at a second end thereof.

2. The method of claim 1, further comprising the step of embedding said at least one optical fiber in a serpentine or other predetermined pattern.

3. The method of claim 2, further comprising the step of embedding a predetermined length of said at least one optical fiber in successive layers of said composite material.

4. The method of claim 3, further comprising the step of embedding two or more optical fibers in said successive layers so that the path of the fibers of one layer is substantially at angles to the path of fibers in a successive layer.

5. The method of claim 1, further comprising the step of positioning said at least one optical fiber so that it is embedded within a predetermined portion of the composite component.

6. The method of claim 1, further comprising the step of positioning a plurality of optical fibers so that they are respectively embedded in predetermined, non-overlapping portions of the composite component.

7. The method of claim 1, further comprising the step of embedding a first fiber in a first predetermined pattern and embedding at least a second fiber in at least a second predetermined pattern so that overlapping of fiber patterns yields additional information relative to the amount of information provided by a single pattern.

8. The method of claim 1, further comprising the step of arranging optical fiber patterns in two dimensional configurations for subsequent positioning in a three dimensional composite component to provide a higher degree of information sophistication and to provide all application capability within two dimensional equipment capability.

9. The method of claim 1, further comprising the step of positioning a second optical fiber within the same portion of a component already covered by a first optical fiber to provide redundancy or to anticipate accidental damage to the service routes to said portion of the component.

* * * * *